Sept. 27, 1949.  R. R. BOLLMAN  2,483,331
ANTIBACKLASH ATTACHMENT FOR FISHING REELS
Filed Sept. 24, 1947
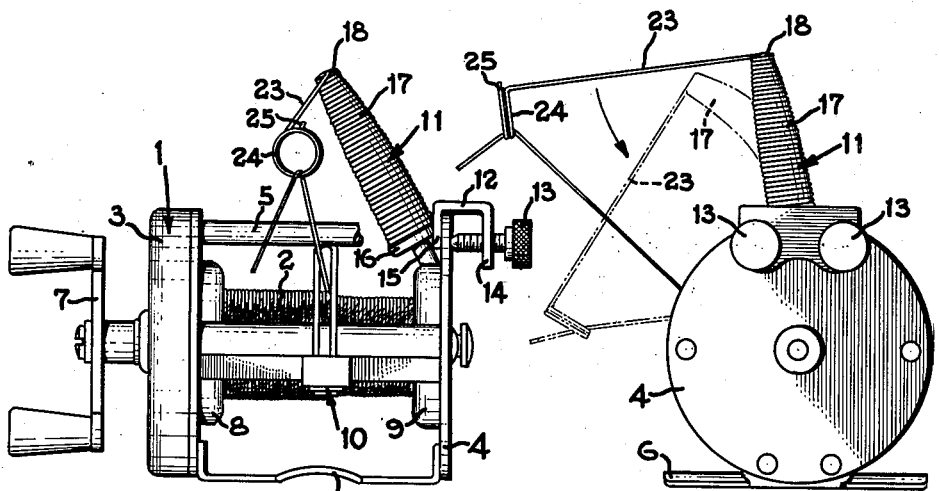
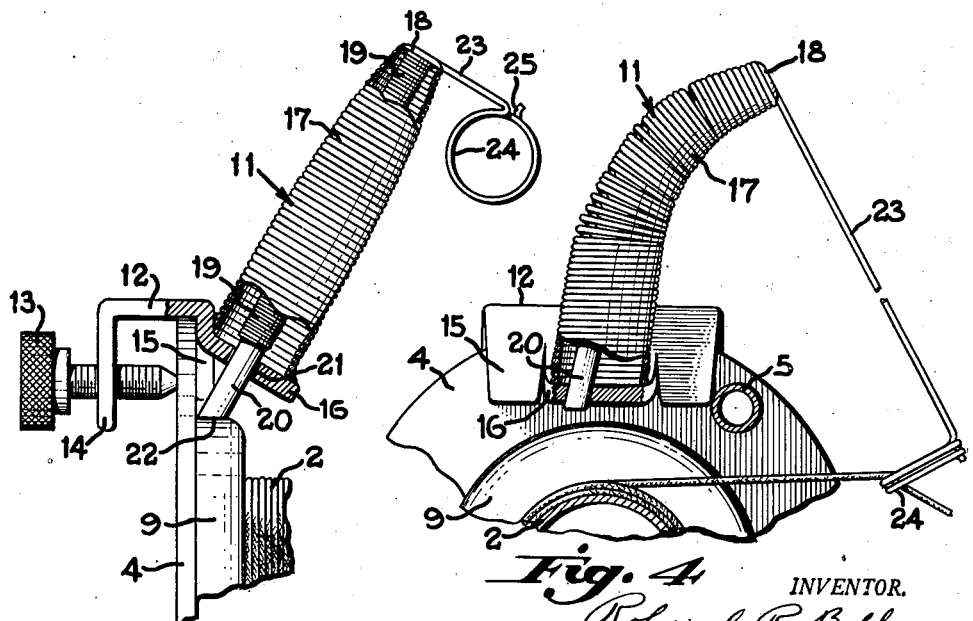
INVENTOR.
Roland R. Bollman
BY
Wood, Arey, Herron & Evans
ATTORNEYS Patented Sept. 27, 1949

2,483,331

UNITED STATES PATENT OFFICE 2,483,331

ANTIBACKLASH ATTACHMENT FOR FISHING REELS

Roland R. Bollman, Cincinnati, Ohio

Application September 24, 1947, Serial No. 775,779

8 Claims. (Cl. 242—84.5)

This invention relates to fishing reels of the type adapted to be used in casting artificial bait, and is addressed particularly to an anti-backlash device in the form of an attachment which may be mounted on a conventional fishing reel for the purpose of stopping rotation of the spool after the bait has struck the water.

Fishing reels of conventional construction require the use of the thumb for preventing the spool from continuing to rotate after the bait and line has lost all forward movement. Reels embodying anti-backlash features of construction heretofore have been proposed, but such equipment is usually of an intricate nature and the apparatus is not only expensive to construct but does not give reliable service unless used carefully.

The principal objective of this invention has been to provide an anti-backlash device of simple, inexpensive nature which readily may be attached to a fishing reel automatically to control the pay-out of the line in accordance with the forward movement of the bait.

The apparatus of the present invention consists essentially of a bracket having a thumb screw or other suitable means by which the bracket may be fastened rigidly by adjustment to a stationary part of the reel; for instance, the end plate opposite the handle. The bracket sustains a braking and control mechanism which is in the form of a yieldable helically wound spring having an eye at its upper end and a brake rod telescopically projecting through it for engagement with the spool of the reel. This control assembly projects in a generally upward direction from the reel and the line is threaded through the eye, thence through the eyelets of the rod in conventional manner. The attachment is positioned on the reel for engagement of the brake with the spool so long as the line is relaxed or remains untensioned, the line passing upwardly from the spool through the brake eyelet and then downwardly through the first rod eyelet. In view of this construction, it is apparent that any tension on the line will drag the brake eyelet downwardly, and the device is so constructed that this movement effects a relative lifting action on the brake thereby relieving the spool so that it may rotate freely. Tension of the line during casting continues under the forward movement of the cast bait until the bait has lost momentum; therefore, the brake is held in released position and the spool is enabled to pay out line freely until the bait reaches the end of its cast. At this time, the tension of the line due to forward movement is relased, the downward pressure on the eyelet of the anti-backlash device is released, and the brake is set automatically to stop further rotation of the spool.

A typical device constructed in accordance with the present invention and embodying these features is shown in the drawings, in which:

Figure 1 is a front elevation of a fishing reel equipped with the anti-backlash attachment.

Figure 2 is an end elevation of the reel and attachment.

Figure 3 is a section taken longitudinally through the reel showing the anti-backlash device and a portion of the reel with the brake in set position.

Figure 4 is a transverse section through the reel showing the position of the anti-backlash device during casting with the brake in off position.

In the device shown in the drawings, the reel is indicated generally at 1 and may be of conventional construction, comprising a spool 2, end plates 3 and 4, the former housing the gear mechanism, a cross-bar 5 and a saddle 6, both of which extend between the end plates 3 and 4, and an operating handle 7. The spool 2 includes end flanges 8 and 9, the flange 9 acting as a brake drum in conjunction with the brake element of the anti-backlash device. The reel also may be equipped with a "level wind" apparatus as indicated generally at 10.

The anti-backlash equipment of the present invention is indicated generally at 11. In the construction shown, this unit includes a bent sheet-metal bracket 12 in the form of a C-clamp having fastening screws 13—13 in the outer arm 14 thereof, while the opposite arm 15 resides in engagement with a stationary portion of the fishing reel, for example, the end wall 4.

The arm 15 also has an ear 16 bent from it angularly, as shown in Figures 1 and 3. This member constitutes a seat for the control mechanism of the attachment. In the construction shown, the C-clamp 12 is somewhat elongated and the clamp screws 13 are located at opposite ends of it so as to obtain purchase upon the end wall 4 of the reel. This construction enables minor adjustments to be made in respect to the spacing of the attachment to the brake drum 9 of the reel by loosening one clamp screw 13 or the other. Also, the C-clamp is of substantial depth whereby the attachment may be fastened upon reels of various types to accommodate difference in spacing from the periphery of the end wall to the periphery of the brake drum or spool.

A yieldable post 17 is mounted upon the seat 16 of the bracket so as to project above the reel by the terminal portion 18 of the post being located substantially at the midpoint of the reel.

The post 17 is hollow and a yieldable shaft 19 extends downwardly through the post terminating in a brake member 20 which traverses a bore 21 in the seat 16 of the bracket. In the preferred construction, the post 17 and the yieldable shaft 19 are made in the form of a helically wound spring, the initial portion of which embraces the brake member 20, then extends upwardly to the terminal portion 18, and then returns in enlarged diameter to the seat 16. In this manner, the post and shaft may be constructed as an integral unit made of wire with the bottom of the post being mounted upon the seat 16 as by soldering. However, the post and shaft may be made of other resilient materials such as rubber, rather than wire, and also may be made as separate units joined together at the terminal 18. The brake element 20 preferably is constructed of friction material, for example fibre, reed, or the like, and its end is angulated as at 22 to fit the brake drum 9.

An arm 23 terminating in an eyelet 24 is fastened as by soldering to the terminal portion 18 of the post, the arm 23 extending in a forward direction for substantial alignment with the fishing rod so that the arm is approximately in longitudinal alignment with the rod, but spaced above it. The eyelet is formed as a double convolution of the wire from which the arm 23 may be made, and the eyelet terminates in an ear 25. The convolutions of the eyelet are spaced apart from one another a slight distance and the ear facilitates the introduction of the fishing line between the convolutions; hence, the line need not be threaded through the eyelet in order to associate the attachment with the reel and rod.

In the use of the device disclosed in the drawings, it is attached conveniently to the rim of the end plate on the left hand side of the reel and in the case of most reels, at a point near the cross-bar and back of the level wind mechanism 10. The unit is mounted in such a position that with the post relaxed the brake element just touches the drum 9 of the spool, and set screws 13 are then tightened lightly until the brake is set in respect to the drum 9. To obtain the final operating adjustment, the line of the rod is placed through the eyelet 24 and, of course, proceeds through the eyelets of the rod end as the bait or artificial lure is attached to it at the end of the rod. The line, for adjustment purposes, may be tensioned conveniently by holding the spool and the rim against rotation with the left thumb and drawing backwardly upon that portion of the line which is between the first and second eyelets of the rod. Through this manipulation the portion of the line between the reel and the first eyelet is drawn taut and in consequence, the eyelet 24 of the anti-backlash device will be lowered, moving from the position shown in Figure 2 to the position shown in Figure 4. As the eyelet 24 is lowered, post 17 and the shaft within the post are bent, as shown in the dot-dash lines of Figure 2, thereby raising the brake element 20. The C-clamp 12 is so adjusted that this operation will cause the brake element 20 to be lifted above the hub periphery 9 about the thickness of a dime. If the brake is not released sufficiently, the post may be elevated to a higher position through adjustment of one screw 13 or the other. On the other hand, if the line is payed out too freely, then the attachment may be lowered to bring the brake element 20 a little closer to the brake drum.

If at any time it is desired to relieve the reel of all possible braking action, the anti-backlash device may be thrown out of operation merely by pushing the post forwardly with the thumb so as to lower the eyelet 24 to a point where it is substantially in alignment with the reel spool and the first eyelet of the rod.

The anti-backlash device is constructed to enable the line to follow the level wind attachment 10 without altering the braking action. This is accomplished by virtue of the spring structure of post 18 which inherently is free to be twisted about its longitudinal axis. The arm 23 forms in effect an extended lever so that the eyelet 24 is free to move about with very little resistance. Therefore, in casting or rewinding, the eyelet 24 moves back and forth following the movements of the line as guided by the level winding device, at the same time keeping the braking element 20 raised from the drum 9.

The device of the present invention in view of its simplicity of construction, may be manufactured at but a fraction of the cost of built-in anti-backlash devices, and is of simple fool-proof construction; hence, capable of giving satisfactory service under the most adverse conditions.

Having described my invention, I claim:

1. An anti-backlash device for a fishing reel comprising, a yieldable post having a yieldable shaft at its interior terminating in a brake shoe adapted for engagement with a spool of a fishing reel, an arm extending from the upward extremity of the post and terminating in an eyelet, and a clamp bracket for sustaining the lower end of said post and having a bore which is traversed by said brake shoe, said clamp bracket being adapted for engagement with a stationary portion of a fishing reel.

2. An anti-backlash device for a fishing reel comprising, a yieldable post having a yieldable shaft at its interior terminating in a brake shoe adapted for engagement with a spool of a fishing reel, an arm extending from the upward extremity of the post and terminating in an eyelet, and a clamp bracket for sustaining the lower end of said post, the said post being constructed of a helical coil spring having its bottom endwise convolutions seated on said bracket.

3. An anti-backlash device for a fishing reel comprising, a yieldable post having a yieldable shaft at its interior terminating in a brake shoe adapted for engagement with a spool of a fishing reel, an arm extending from the upward extremity of the post and terminating in an eyelet, and a clamp bracket for sustaining the lower end of said post, the said post and shaft within the post being constructed of helical coil springs joined together at the terminal portion of the post.

4. An anti-backlash device for a fishing reel comprising, a C-clamp having a portion extending therefrom constituting a seat, a helical spring fastened on said seat projecting upwardly therefrom, a yieldable shaft residing within said post and having one end connected to the upper extremity thereof and the opposite end carrying a brake element, the said brake element having a portion residing at a point underneath said seat, and an eyelet at the end of said helical spring.

5. An anti-backlash device for a fishing reel comprising, a clamp device, a seat extending from the clamp device and having a guide aperture, a shaft member disposed in said guide aperture and having a brake portion underneath said seat and a yieldable portion at the opposite side of said seat, a yieldable post mounted on said seat around said shaft with the upper end of the shaft and post being interconnected for bending movement in unison whereby the shaft is moved longitudinally through the guide aperture, and an arm extending longitudinally from the post and terminating in an eyelet.

6. An anti-backlash device for a fishing reel comprising, a C-clamp having a portion extending therefrom constituting a seat having a guide aperture, a shaft member disposed in said guide aperture and having a brake portion underneath said seat and a yieldable portion at the opposite side of said seat, a yieldable post mounted on said seat around said shaft with the upper end of the shaft and post being interconnected for bending movement in unison whereby the shaft is moved longitudinally through the guide aperture, and an arm extending longitudinally from the post and terminating in an eyelet, the said clamp being constructed and arranged for mounting upon the end plate of a fishing reel for engagement of the brake element of the attachment with the adjacent hub of the spool of the fishing reel.

7. An anti-backlash device for a fishing reel comprising, a clamp device adapted to be secured to the frame of a fishing reel, a flexible tubular post having one end secured to said clamp device, an elongated flexible brake element disposed within said post having an end secured to the free end of the post, said brake element being slidably associated with said clamp device and arranged to engage frictionally the spool of a fishing reel, and an eyelet associated with said post adapted to receive the line from the reel to actuate said post and brake element.

8. An anti-backlash device for a fishing reel comprising a clamp device adapted to be secured to the frame of a fishing reel, an elongated flexible brake element slidably associated with said clamp device and arranged to engage frictionally the spool of a fishing reel, a flexible post for sustaining said brake element with the brake element joined to the post and arranged to cause longitudinal movement of the brake element relative to the spool when the post is sprung angularly, an arm extending from said post and an eyelet at the end of said arm adapted to receive the line from the reel to actuate said post and brake element.

ROLAND R. BOLLMAN.

No references cited.